US011937127B2

(12) United States Patent
Taft et al.

(10) Patent No.: US 11,937,127 B2
(45) Date of Patent: *Mar. 19, 2024

(54) SYSTEMS AND METHODS FOR EXPOSING CUSTOM PER FLOW DESCRIPTOR ATTRIBUTES

(71) Applicant: Verizon Patent and Licensing Inc., Basking Ridge, NJ (US)

(72) Inventors: David Taft, Keller, TX (US); Nicklous D. Morris, Trophy Club, TX (US); Parry Cornell Booker, Arlington, TX (US); Ye Huang, San Ramon, CA (US); Jerry Steben, Fort Worth, TX (US); Maqbool Chauhan, Keller, TX (US); Kalyani Bogineni, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,864

(22) Filed: Sep. 6, 2022

(65) Prior Publication Data

US 2023/0007537 A1 Jan. 5, 2023

Related U.S. Application Data

(63) Continuation of application No. 17/107,172, filed on Nov. 30, 2020, now Pat. No. 11,463,915.

(51) Int. Cl.
*H04W 28/10* (2009.01)
*H04L 45/00* (2022.01)
(Continued)

(52) U.S. Cl.
CPC ............. *H04W 28/10* (2013.01); *H04L 45/50* (2013.01); *H04L 45/66* (2013.01); *H04L 45/74* (2013.01)

(58) Field of Classification Search
CPC ........ H04W 28/10; H04L 45/50; H04L 45/66; H04L 45/74
See application file for complete search history.

(56) References Cited

U.S. PATENT DOCUMENTS 11,463,915 B2 * 10/2022 Taft ....................... H04W 28/10
2020/0112504 A1 4/2020 Osman
(Continued)

OTHER PUBLICATIONS

"3rd Generation Partnership Project; Technical Specification Group Core Network and Terminals; 5G System; Common Data Types for Service Based Interfaces; Stage 3 (Release 16)", 3GPP TS 29.571 V16.3.0 (Mar. 2020) Technical Specification. 100 pages.
(Continued)

*Primary Examiner* — Donald L Mills

(57) ABSTRACT

A device may include a processor configured to establish a data traffic flow for a user equipment (UE) device and determine per flow descriptor attributes associated with the data traffic flow, wherein the per flow descriptor attributes identify at least a source, a destination, and a protocol associated with the data traffic flow. The processor may be further configured to determine at least one additional per flow descriptor attribute for the data traffic flow and send the per flow descriptor attributes and the at least one additional per flow descriptor attribute to a network exposure device of a core network, wherein the network exposure device is configured to communicate with servers outside the core network.

20 Claims, 10 Drawing Sheets

(51) Int. Cl.
H04L 45/50 (2022.01)
H04L 45/74 (2022.01)

(56) References Cited

U.S. PATENT DOCUMENTS

| | | | |
|---|---|---|---|
| 2020/0221527 A1* | 7/2020 | Bharatia | H04W 8/02 |
| 2021/0136548 A1 | 5/2021 | Mladin et al. | |
| 2021/0176613 A1 | 6/2021 | Purkayastha et al. | |
| 2021/0250192 A1 | 8/2021 | Alonso Franco et al. | |
| 2022/0116311 A1* | 4/2022 | Mestery | H04L 45/021 |
| 2022/0141662 A1* | 5/2022 | Liao | H04L 63/10 |
| | | | 726/1 |
| 2022/0174521 A1* | 6/2022 | Yao | H04L 43/10 |

OTHER PUBLICATIONS

"3rd Generation Partnership Project; Technical Specification Group Core Network and Terminals; 5G System; Packet Flow Description Management Service; Stage 3 (Release 16)", 3GPP TS 29.551 V16.3.0 (Mar. 2020) Technical Specification. 30 pages.

"3rd Generation Partnership Project; Technical Specification Group Services and System Aspects; Policy and charging control framework for the 5G System (SGS); Stage 2 (Release 16)", 3GPP TS 23.503 V16.3.0 (Dec. 2019) Technical Specification. 112 pages.

"3rd Generation Partnership Project; Technical Specification Group Services and System Aspects; Procedures for the 5G System (SGS); Stage 2 (Release 16)", 3GPP TS 23.502 V16.3.0 (Dec. 2019) Technical Specification. 558 pages.

"3rd Generation Partnership Project; Technical Specification Group Services and System Aspects; System architecture for the 5G System (SGS); Stage 2 (Release 16)", 3GPP TS 23.501 V16.3.0 (Dec. 2019) Technical Specification. 417 pages.

* cited by examiner

SYSTEMS AND METHODS FOR EXPOSING CUSTOM PER FLOW DESCRIPTOR ATTRIBUTES

CROSS-REFERENCE TO RELATED APPLICATIONS

This patent application is a continuation of U.S. patent application Ser. No. 17/107,172, filed on Nov. 30, 2020, and titled "SYSTEMS AND METHODS FOR EXPOSING CUSTOM PER FLOW DESCRIPTION ATTRIBUTES," the disclosure of which is hereby incorporated by reference in their entirety.

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. The communications network may need to provide different types of services to a large number of diverse devices under various types of conditions. Managing a large number of different services under different conditions poses various challenges.

DETAILED DESCRIPTION OF PREFERRED EMBODIMENTS

Figure 1:
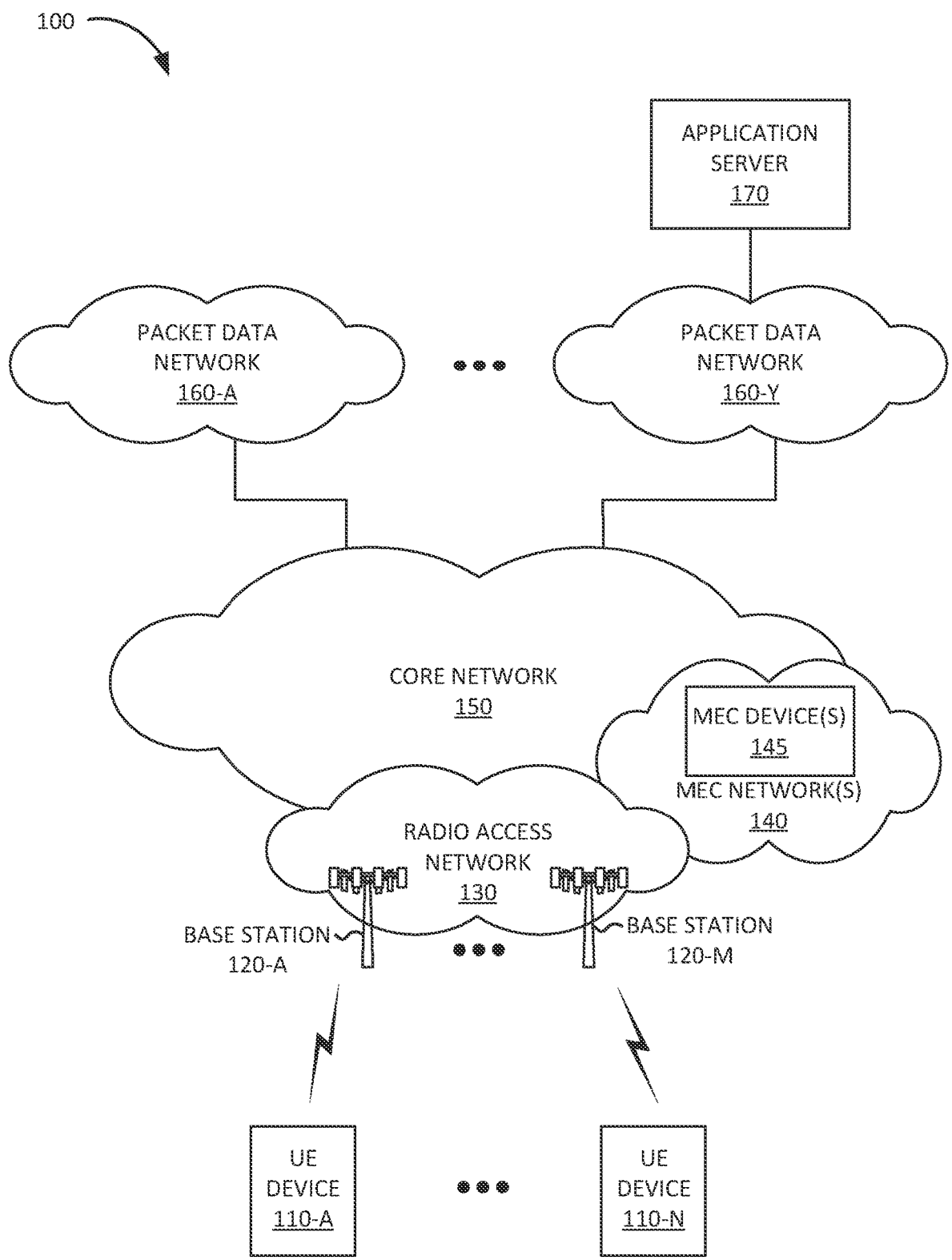
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable wireless communication devices (e.g., smart phones, etc.), referred to as user equipment (UE) devices, to connect to networks and obtain services via the provider's core network, such as a Fourth Generation (4G) core network and/or a Fifth Generation (5G) core network. For example, a UE device may connect to a third-party application server via a browser application or another type of application installed on the UE device. The application server may, for example, stream video or audio to the UE device, may provide real-time gaming, host a web site, provide a peer-to-peer messaging service, and/or perform another type of service for UE devices.

The application server may need information relating to a data flow, associated with the UE device, through the core network. As an example, the application server may use particular parameters to determine whether a data traffic flow should be routed to a central application server or to a local server implemented in a Multi-Access Edge Computing (MEC) network. As another example, the application server may assign different priorities to different types of data traffic flows based on particular parameters. However, the application server may not be able to access information relating to the data flow through the core network, because the application server may be located outside the core network and not have access to information relating to data flows in the core network.

Implementations described herein relate to systems and methods for exposing custom per flow descriptor attributes. A gateway device may set up a connection for a UE device from a base station to a packet data network. The gateway device may correspond to a 4G gateway device, such as a Packet Data Network Gateway (PGW), a 5G gateway device, such as a User Plane Function (UPF), and/or another type of gateway device. In response to setting up a connection for the UE device, the gateway device may send a per flow descriptor (PFD) message to an exposure function device that is configured to communicate with a server device outside the core network. For example, the exposure function device may be configured to expose services or capabilities to application servers outside the core network. The exposure function device may correspond to a 4G exposure function device, such as a Service Capability Exposure Function (SCEF), a 5G exposure function device, such as a Network Exposure Function (NEF), and/or another type of network exposure device. In some implementations, a core network may include a network exposure device configured to function as both a 4G SCEF and a 5G NEF.

Thus, the gateway device may establish the data traffic flow for the UE device and determine PFD attributes for the data traffic flow, including a source Internet Protocol (IP) address, a destination IP address, and a protocol associated with the data flow. Furthermore, the gateway device may determine additional PFD attributes for the data traffic flow.

The additional PFD attributes may include, for example, a 5-tuple hash of the source IP address, a source IP address port, the destination IP address, a destination IP address port, and the protocol associated with the data flow. Furthermore, the additional PFD attributes may include one or more of an application signature for an application associated with the data traffic flow, a network slice parameter value associated with the data traffic flow, a security parameter value associated with the data traffic flow, a multicast parameter value associated with the data traffic flow, a multiprotocol label switching (MPLS) parameter value associated with the data traffic flow, a gateway protocol parameter value associated with the data traffic flow, a segment routing parameter value, a gaming protocol parameter value associated with the data traffic flow, and/or another type of parameter value associated with the data traffic flow.

The gateway device may send the PFD attributes, and the additional PFD attributes, to a network exposure device (e.g., a SCEF or NEF device) in the core network. The network exposure device may provide the PFD attributes associated with the data flow to an application server associated with the data flow. The application server may respond with an instruction to perform an action on the data flow and the network exposure device may forward the instruction to the gateway device. The gateway device may receive the instruction and perform the action on the data traffic flow.

As an example, the action may include assigning a priority value to the data traffic flow and scheduling data traffic associated with the data traffic flow based on the assigned priority value. As another example, the action may include filtering the data traffic flow based on a filtering criterion received from the network exposure device. As yet another example, the action may include routing the data traffic flow to a destination based on a destination address received from the network exposure device. For example, the gateway device may route the data traffic flow to a data center, route the data traffic flow to a MEC network, route the data traffic flow to a destination via a Layer 2 connection, perform a local breakout (LBO) on the data traffic flow, and/or route the data traffic flow to a different type of destination.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), radio access network (RAN) 130 that includes base stations 120-A to 120-M (referred to herein collectively as "base stations 120" and individually as "base station 120"), MEC network(s) 140 that include MEC device(s) 145, core network 150, packet data networks (PDNs) 160-A to 160-Y (referred to herein collectively as "PDNs 160" and individually as "PDN 160"), and an application server 170.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, or another type of portable computer; a desktop computer; a customer premises equipment (CPE) device, such as a set-top box or a digital media player (e.g., Apple TV®, Google Chromecast®, Amazon Fire TV®, Roku®, etc.), a Wi-Fi® access point, a smart television, etc.; a portable gaming system; a global positioning system (GPS) device; a home appliance device; a home monitoring device; and/or any other type of computer device with wireless communication capabilities. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as Machine Type Communication (MTC), and/or another type of M2M communication for Internet of Things (IoT) applications. For example, UE device 110 may include a sensor device and/or an actuator device, such as a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a sensor and/or device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

Base station 120 may include a 5G New Radio (NR) base station (e.g., a gNodeB) and/or a 4G Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.).

RAN 130 may include base stations 120 and be managed by a provider of wireless communication services. RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 140 may be associated with one or more base stations 120 and may provide MEC services for UE devices 110 attached to the one or more base stations 120. MEC network 140 may be in proximity to the one or more base stations 120 from a geographic and network topology perspective, thus enabling low latency communication with UE devices 110 and/or base stations 120. As an example, MEC network 140 may be located on a same site as one of the one or more base stations 120. As another example, MEC network 140 may be geographically closer to the one or more base stations 120, and reachable via fewer network hops and/or fewer switches, than other base stations 120 and/or packet data networks 160. As yet another example, MEC network 140 may be reached without having to go through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed virtualized network functions (VNFs), which use virtualization based on virtual machines, and/or cloud native functions (CNFs), which use virtualization based on containers, used to implement particular network slices. Thus, MEC devices 145 may form part of an infrastructure for hosting network slices. For example, an Low Latency Communication (LLC) infrastructure may enable VNFs and/or CNFs, which use virtualization based on containers, to be implemented in a first MEC network 140 that includes MEC devices 145 accessible via a PGW or UPF connection, while a Ultra (U)-LLC infrastructure may enable VNFs and/or CNFs to be implemented in a second MEC network 140 that includes MEC devices 145 accessible without having to establish a connection via a PGW or UPF, by enabling a direct connection from base station 120 to MEC device 145. In some implementations, MEC device 145 may include a local application server associated with application server 170.

Core network 150 may be managed by the provider of cellular wireless communication services and may manage communication sessions of subscribers connecting to core network 150 via RAN 130. For example, core network 150 may establish an Internet Protocol (IP) connection between UE devices 110 and PDN 160. Core network 150 may include a 4G core network. Exemplary components of a 4G core network are described below with reference to FIG. 2. Core network 150 may include a 5G core network. Exemplary components of a 5G core network are described below with reference to FIG. 3.

The components of core network 150 may be implemented as dedicated hardware components, VNFs, and/or CNFs, implemented on top of a common shared physical infrastructure using Software Defined Networking (SDN). For example, an SDN controller may implement one or more of the components of core network 150 using an adapter implementing a VNF virtual machine, a CNF container, an event driven serverless architecture interface, and/or another type of SDN architecture. The common shared physical infrastructure may be implemented using one or more devices 400 described below with reference to FIG. 4 in a cloud computing center associated with core network 150. Additionally, or alternatively, some, or all, of the common shared physical infrastructure may be implemented using one or more devices 400 included in MEC device 145.

PDNs 160-A to 160-Y may each include a packet data network. A particular PDN 160 may be associated with an Access Point Name (APN) and UE device 110 may request a connection to the particular packet data network 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, 4G network, 5G network, etc.), an ad hoc network, a telephone network (e.g., the Public Switched Telephone Network (PSTN) or a cellular network), an intranet, or a combination of networks.

Application server 170 may include a computer device that hosts an application used by UE device 110 and/or provides another type of service to UE device 110. For example, application server 170 may host video and/or audio content and may stream video and/or audio to UE device 110, may host a game played by the user of UE device 110, may provide cloud computing services to UE device 110, may host a social media or another type of website, and/or may host another type of application and/or provide another type of service. Application server 170 may request PFD information associated with UE device 110 from a network exposure device, such as an SCEF and/or NEF device, and may instruct the network exposure device to perform an action based on the requested PFD information.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
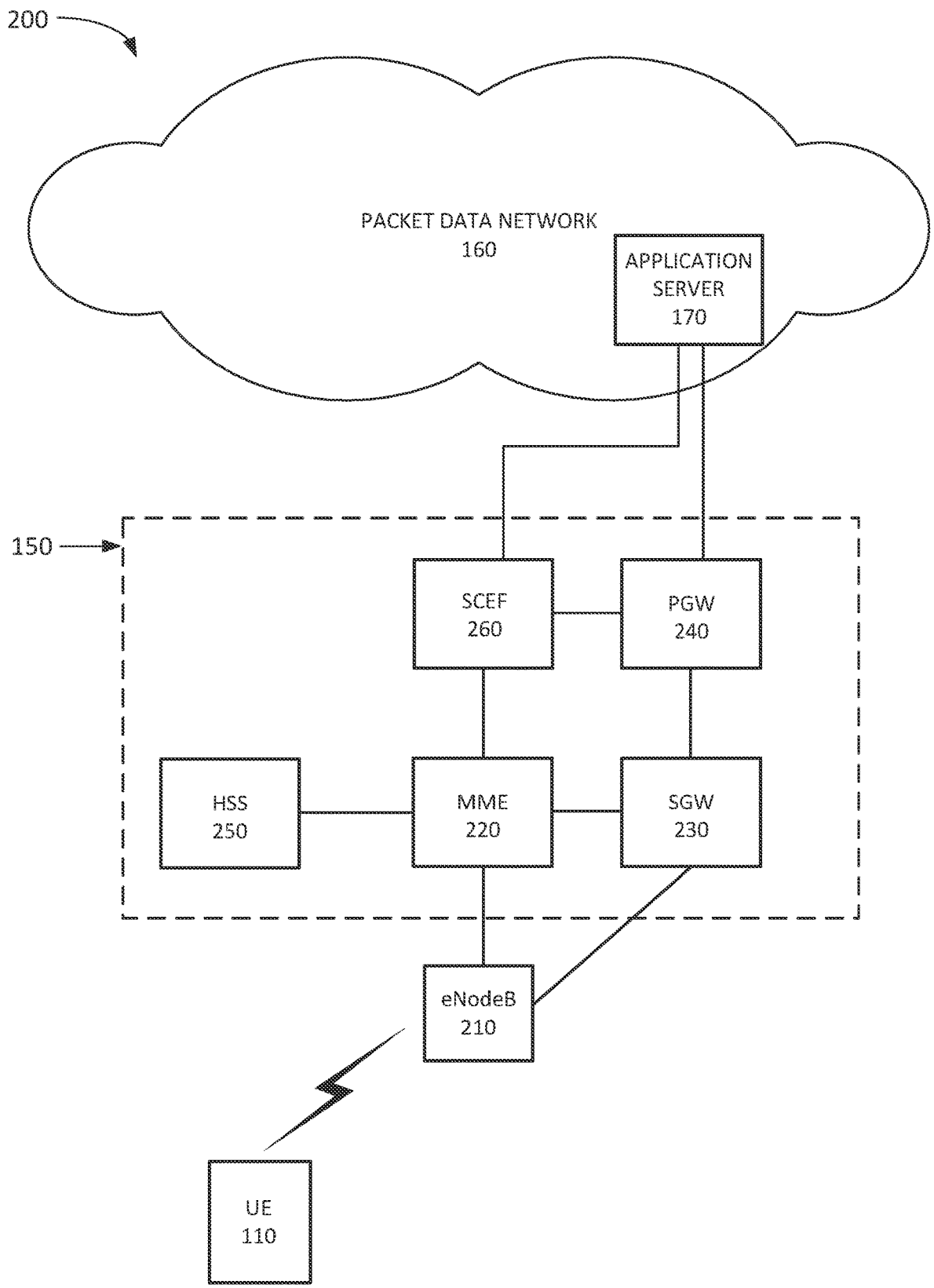
FIG. 2 illustrates exemplary components of the core network of FIG. 1 according to an implementation described herein.

FIG. 2 is a diagram illustrating an implementation 200 of core network 150 as a 4G core network. As shown in FIG. 2, implementation 200 includes UE device 110, eNodeB 210, core network 150, and packet data network 160. Core network 150 may include eNodeB 210 (corresponding to base station 120), a mobility management entity (MME) 220, a serving gateway (SGW) 230, a PGW 240, a home subscriber server (HSS) 250, and an SCEF 260. While FIG. 2 depicts a single eNodeB 210, MME 220, SGW 230, PGW 240, HSS 250, and SCEF 260 for illustration purposes, in practice, FIG. 2 may include multiple eNodeBs 210, MMES 220, SGWs 230, PGWs 240, HSS 250, and SCEFs 260.

eNodeB 210 may correspond to base station 120. eNodeB 210 may interface with core network 150 via an interface referred to as an S1 interface, which may be split into a control plane S1-MME interface and a data plane S1-U interface. S1-MME interface may interface with MME 220 and be implemented, for example, with a protocol stack that includes a Network Access Server (NAS) protocol and/or Stream Control Transmission Protocol (SCTP). An S1-U interface may interface with SGW 230 and may be implemented, for example, using General Tunneling Protocol version 2 (GTPv2).

MME 220 may implement control plane processing for core network 150. For example, MME 220 may implement tracking and paging procedures for UE device 110, may activate and deactivate bearers for UE device 110, may authenticate a user of UE device 110, and may interface to other radio access networks. A bearer may represent a logical channel with particular quality of service (QoS) requirements. MME 220 may also select a particular SGW 230 for a particular UE device 110. A particular MME 220 may interface with other MMES 220 in core network 150 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface that is implemented, for example, using GTPv2.

PGW 240 may function as a gateway to provider network 240 through an SGi interface. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 220 may communicate with SGW 230 through an S11 interface that is implemented, for example, using GTPv2. The S11 interface may be used to create and manage a new session for a particular UE device 110 and activated when MME 220 needs to communicate with SGW 230, such as when the particular UE device 110 attaches to core network 150, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to core network 150). MME 220 may communicate with HSS 250 through an S6a interface that is implemented, for example, using a Diameter protocol.

SCEF 260 may expose the services and/or capabilities of core network 150 and/or RAN 130 to application server 170. For example, application server 170 may use an API to request information relating to UE device 110 and/or to provide information relating to UE device 110 with respect to a particular service or capability. In particular, application server 170 may request information identifying UE device 110 from SCEF 260 using an API.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150.

Figure 3:
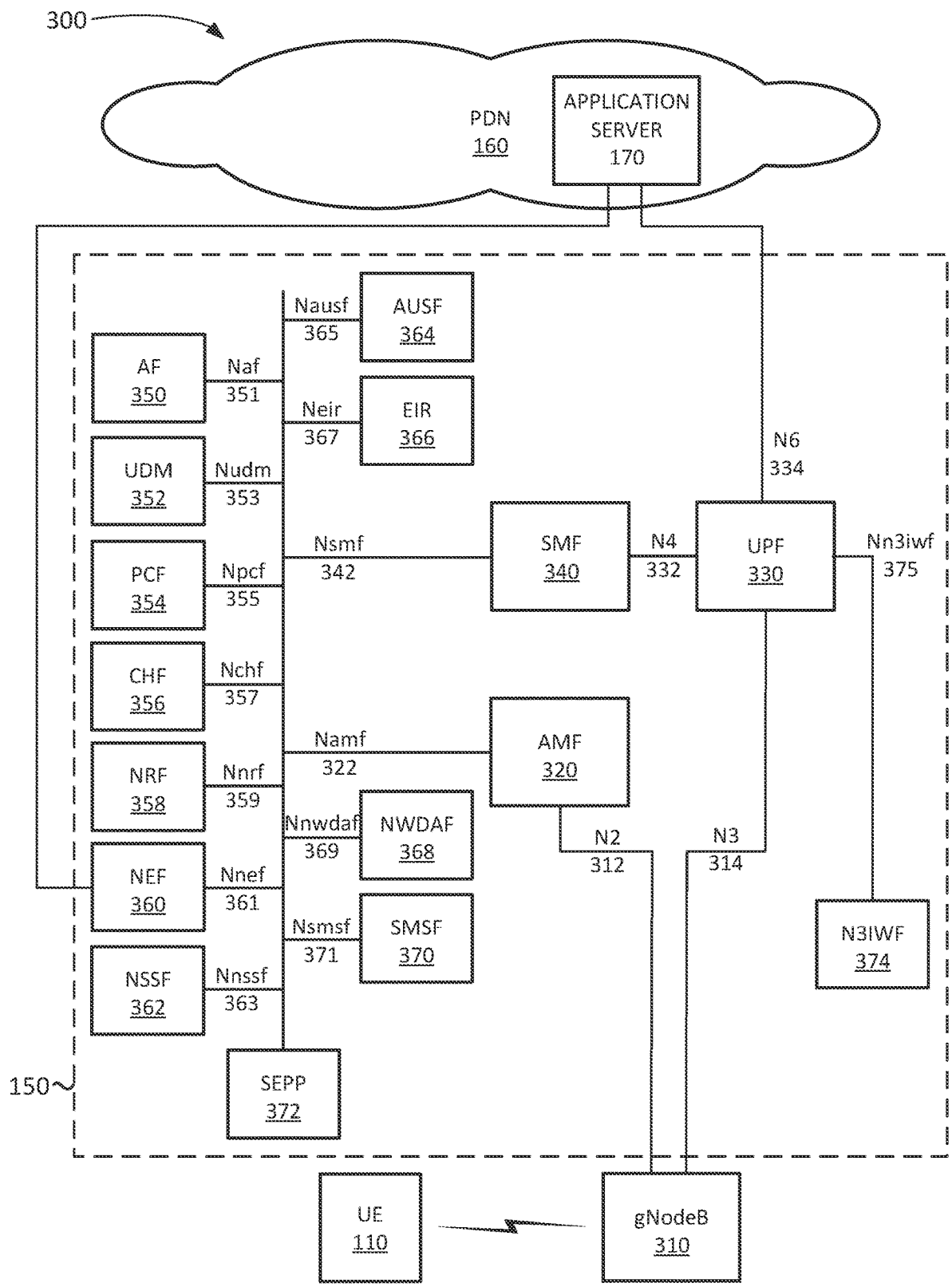
FIG. 3 illustrates exemplary components of the core network of FIG. 1 according to another implementation described herein.

FIG. 3 illustrates an implementation 300 of core network 150 as a 5G core network. As shown in FIG. 3, implementation 300 includes UE device 110, gNodeB 310, core network 150, and packet data network 160. Core network 150 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Charging Function (CHF) 356, a Network Repository Function (NRF) 358, a Network Exposure Function (NEF) 360, a Network Slice Selection Function (NSSF) 362, an Authentication Server Function (AUSF) 364, a 5G Equipment Identity Register (EIR) 366, a Network Data Analytics Function (NWDAF) 368, a Short Message Service Function (SMSF) 370, a Security Edge Protection Proxy (SEPP) 372, and a Non-3GPP Inter-Working Function (N3IWF) 374.

While FIG. 3 depicts a single AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, and N3IWF 374 for illustration purposes, in practice, core network 301 may include multiple AMFs 320, UPFs 330, SMFs 340, AFs 350, UDMs 352, PCFs 354, CHFs 356, NRFs 358, NEFs 360, NSSFs 362, AUSFs 364, EIRs 366, NWDAFs 368, SMSFs 370, SEPPs 372, and/or N3IWFs 374. gNodeB 310 may be part of RAN 120 and may include base station 125. Exemplary components of gNodeB 310 are describe below with reference to FIG. 3.

AMF 320 may perform registration management, connection management, reachability management, mobility management, lawful intercepts, Short Message Service (SMS) transport between UE device 110 and SMSF 370, session management messages transport between UE device 110 and SMF 340, access authentication and authorization, location services management, functionality to support non-3GPP access networks, and/or other types of management processes. AMF 320 may be accessible by other function nodes via an Namf interface 322.

UPF 330 may maintain an anchor point for intra/inter-RAT mobility, maintain an external Packet Data Unit (PDU) point of interconnect to a particular packet data network 160, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 310), and/or perform other types of user plane processes. UPF 330 may communicate with SMF 340 using an N4 interface 332 and connect to packet data network 160 using an N6 interface 334.

SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward PCF 354, perform lawful intercepts, charge data collection, support charging interfaces, control and coordinate of charging data collection, terminate session management parts of Non-Access Stratum messages, perform downlink data notification, manage roaming functionality, and/or perform other types of control plane processes for managing user plane data. SMF 340 may be accessible via an Nsmf interface 342.

AF 350 may provide services associated with a particular application, such as, for example, an application for influencing traffic routing, an application for accessing NEF 360, an application for interacting with a policy framework for policy control, and/or other types of applications. AF 350 may be accessible via an Naf interface 351, also referred to as an NG5 interface.

UDM 352 may maintain subscription information for UE devices 110, manage subscriptions, generate authentication credentials, handle user identification, perform access authorization based on subscription data, maintain service and/or session continuity by maintaining assignment of SMF 340 for ongoing sessions, support SMS delivery, support lawful intercept functionality, and/or perform other processes associated with managing user data. UDM 352 may store, in a subscription profile associated with a particular UE device 110, a list of network slices which the particular UE device 110 is allowed to access. UDM 352 may be accessible via a Nudm interface 353.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 355. CHF 356 may perform charging and/or billing functions for core network 150. CHF 356 may be accessible via Nchf interface 357.

NRF 358 may support a service discovery function and maintain profiles of available network function (NF) instances and their supported services. An NF profile may include an NF instance ID, an NF type, a Public Land Mobile Network (PLMN) ID(s) associated with the NF, network slice IDs associated with the NF, capacity information for the NF, service authorization information for the NF, supported services associated with the NF, endpoint information for each supported service associated with the NF, and/or other types of NF information. NRF 358 may be accessible via an Nnrf interface 359.

NEF 360 may expose services, capabilities, and/or events to other NFs, including third party NFs, AFs, edge computing NFs, and/or other types of NFs. Furthermore, NEF 360 may secure provisioning of information from external applications to core network 150, translate information between core network 150 and devices/networks external to core network 150, support a Packet Flow Description (PFD) function, and/or perform other types of network exposure functions. For example, application server 170 may use an API to request PFD information relating to a data traffic flow from NEF 360 using an API.

NSSF 362 may select a set of network slice instances to serve a particular UE device 110, determine network slice selection assistance information (NSSAI), determine a particular AMF 320 to serve a particular UE device 110, and/or perform other types of processing associated with network slice selection or management. NSSF 362 may provide a list of allowed slices for a particular UE device 110 to UDM 352 to store in a subscription profile associated with the particular UE device 110. NSSF 362 may be accessible via Nnssf interface 363.

AUSF 364 may perform authentication. For example, AUSF 364 may implement an Extensible Authentication Protocol (EAP) authentication server and may store authentication keys for UE devices 110. AUSF 364 may be accessible via Nausf interface 365. EIR 366 may authenticate a particular UE device 110 based on UE device identity, such as a Permanent Equipment Identifier (PEI). For example, EIR 366 may check to determine if a PEI has been blacklisted. EIR 366 may be accessible via Neir interface 367. NWDAF 368 may collect analytics information associated with radio access network 130 and/or core network 150. SMSF 370 may perform SMS services for UE devices 110. SMSF 370 may be accessible via Nsmsf interface 371. SEPP 372 may implement application layer security for all layer information exchanged between two NFs across two different Public Land Mobile Networks. N3IWF 374 may interconnect to a non-3GPP access device, such as, for example, a WiFi access point (not shown in FIG. 3). N3IWF 374 may facilitate handovers for UE device 110 between radio access network 130 and the non-3GPP access device. N3IWF 374 maybe accessible via Nn3iwf interface 375.

Although FIG. 3 shows exemplary components of core network 150, in other implementations, core network 150 may include fewer components, different components, differently arranged components, or additional components than depicted in FIG. 3. Additionally, or alternatively, one or more components of core network 150 may perform functions described as being performed by one or more other components of core network 150. For example, core network 150 may include additional function nodes not shown in FIG. 3, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 3, additionally, or alternatively, core network 150 may include a reference point architecture that includes point-to-point interfaces between particular function nodes.

Figure 4:
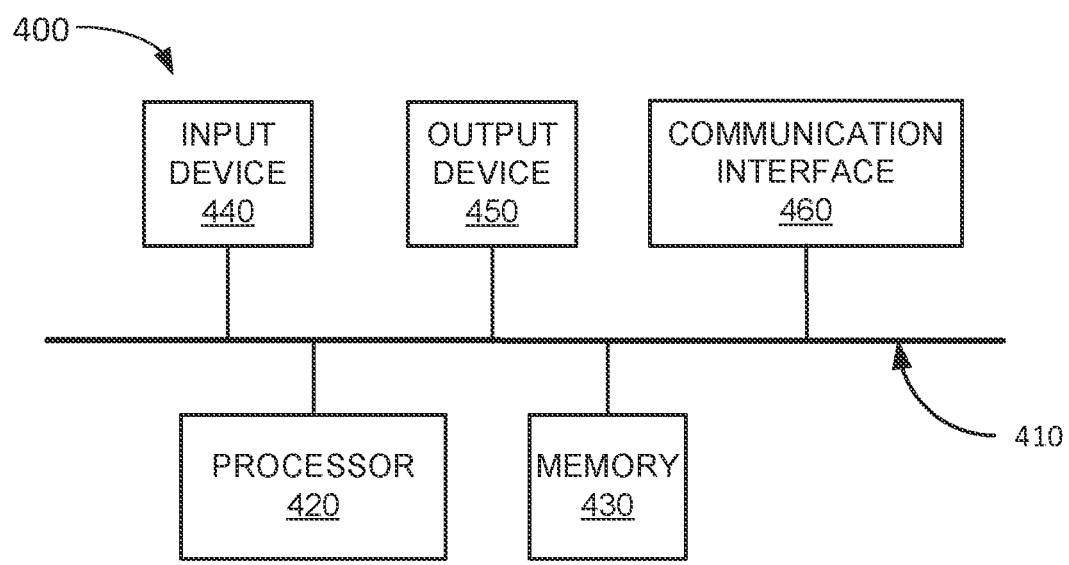
FIG. 4 illustrates exemplary components of a device that may be included in the components of FIG. 1, 2, or 3 according to an implementation described herein.

FIG. 4 is a diagram illustrating example components of a device 400 according to an implementation described herein. Each of the components of FIGS. 1, 2, and/or 3 may include, or be implemented on, one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some implementations, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the user. In some implementations, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to exposure of PFD information. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
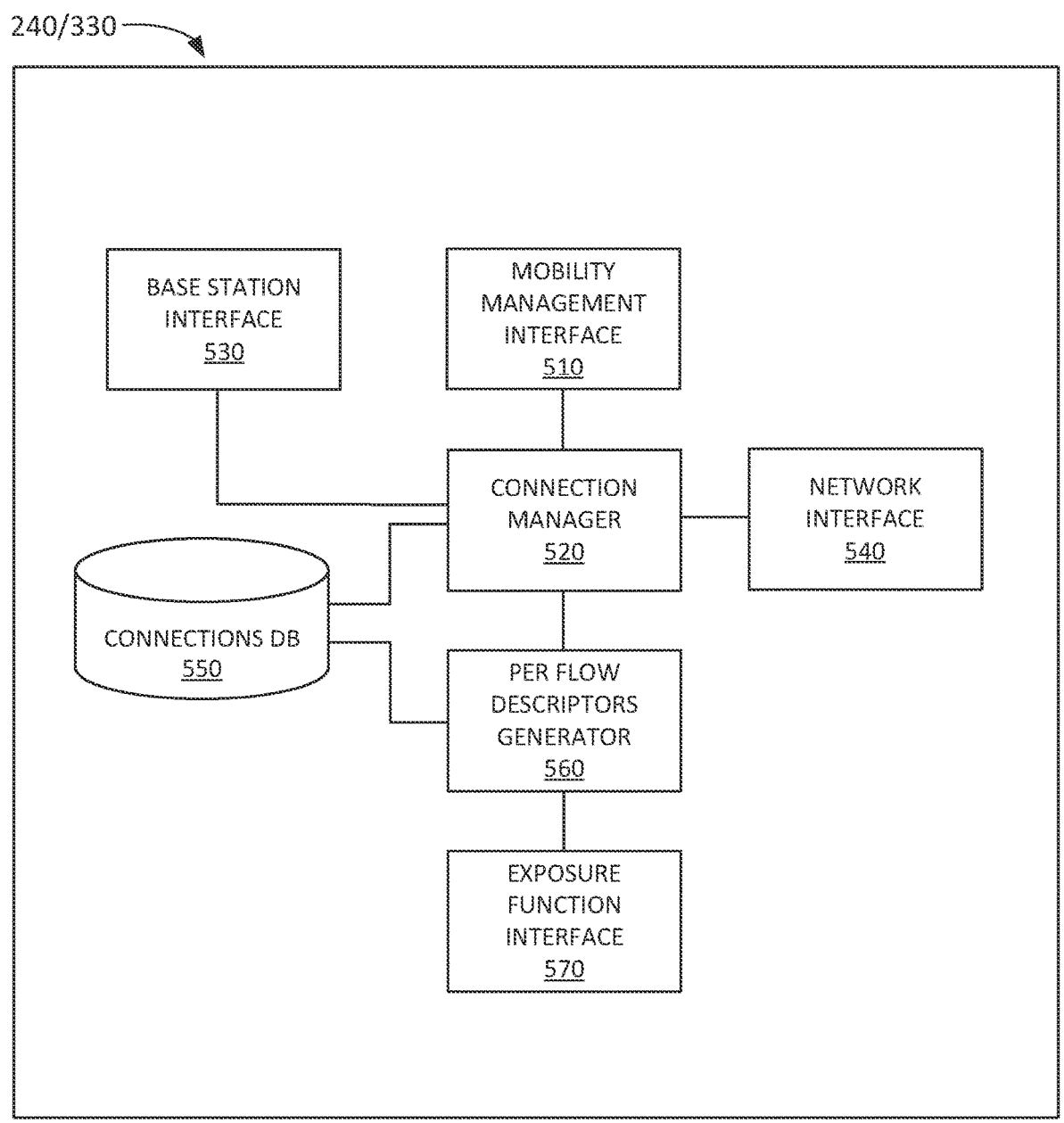
FIG. 5 illustrates exemplary components of the packet data network gateway of FIG. 2 or the user plane function of FIG. 3 according to an implementation described herein.

FIG. 5 is a diagram illustrating exemplary components of PGW 240 or UPF 330. The components of PGW 240 or UPF 330 may be implemented, for example, via processor 420 executing instructions from memory 430. Alternatively, some or all of the components of PGW 240 or UPF 330 may be implemented via hard-wired circuitry. As shown in FIG. 5, PGW 240 or UPF 330 may include a mobility management interface 510, a connection manager 520, a base station interface 530, a network interface 540, a connections DB 550, a PFD generator 560, and an exposure function interface 570.

Mobility management interface 510 may be configured to communicate with a mobility management device in core network 150, such as MME 220 or AMF 320. For example, mobility management interface 510 may receive an instruction from MME 220 or AMF 320 to set up a connection for UE device 110.

Connection manager 520 may manage connections associated with UE devices 110. For example, connection manager 520 may allocate an IP address and/or port to UE device 110 when UE device 110 attaches to core network 150 and may establish a connection between base station 120 serving UE device 110 and a network, such as packet data network 160 and/or MEC network 140. Base station interface 530 may be configured to communicate with base station 120, such as eNodeB 210 and/or gNodeB 310, that is serving UE device 110. Network interface 540 may be configured to communicate with a network with which UE device 110 is to communicate, such as packet data network 160 and/or MEC network 140.

Connections DB 550 may store information relating to UE device 110 data traffic flow connections managed by connection manager 520. The information stored in connections DB 550 may be determined by connection manager 520 based on information included in PDUs associated with a data traffic flow connection. Connections DB 550 may store, for a particular data traffic flow connection, information identifying UE device 110 associated with the data traffic flow connection (e.g., Mobile Station International Subscriber Directory Number (MSISDN), International Mobile Subscriber Identity (IMSI), etc.); a source IP address associated with the data traffic flow connection; a source port associated with the data traffic flow connection; a destination IP address associated with the data traffic flow connection; a destination port associated with the data traffic flow connection; a protocol associated with the data traffic flow connection; a 5-tuple hash of the source IP address, source port, destination IP address, destination port, and protocol; an application ID and/or an application signature for an application associated with the data traffic flow; a network slice parameter value associated with the data traffic flow; a security parameter value associated with the data traffic flow; a multicast parameter value associated with the data traffic flow; an MPLS parameter value associated with the data traffic flow; a gateway protocol (e.g., a Border Gateway Protocol (BGP), etc.) parameter value associated with the data traffic flow; a gaming protocol parameter value associated with the data traffic flow; a segment routing parameter value associated with the data traffic flow; and/or another type of parameter value associated with the data traffic flow.

PFD generator 560 may generate a PFD message, which includes PFD information associated with a data traffic flow, when the data traffic flow connection is established, and send the PFD message to a network exposure device, such as SCEF 260 or NEF 360 via exposure function interface 570. Exposure function interface 570 may be configured with SCEF 260 and/or NEF 360.

Although FIG. 5 shows exemplary components of PGW 240 or UPF 330, in other implementations, PGW 240 or UPF 330 may include fewer components, different components, additional components, or differently arranged components than depicted in FIG. 5. Additionally, or alternatively, one or more components of PGW 240 or UPF 330 may perform one or more tasks described as being performed by one or more other components of PGW 240 or UPF 330.

Figure 6:
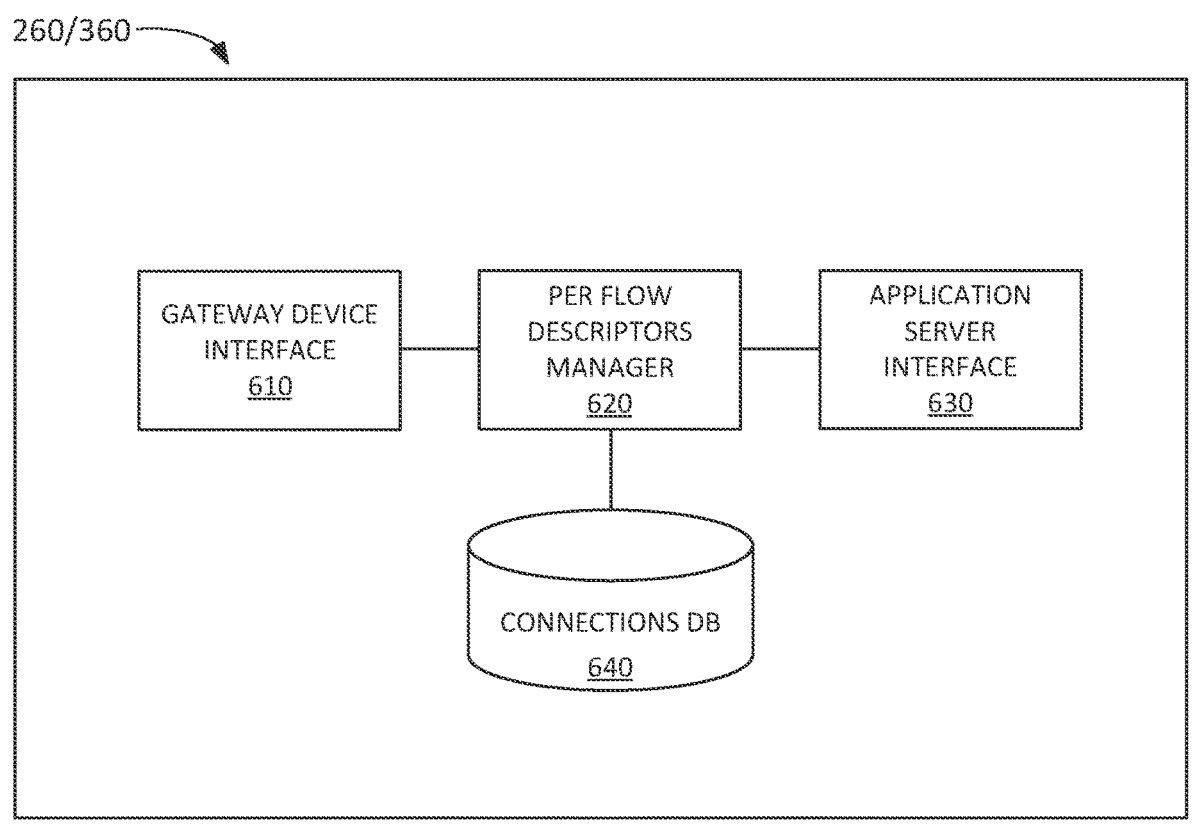
FIG. 6 illustrates exemplary components of the services and capabilities exposure function of FIG. 2 or the network exposure function of FIG. 3 according to an implementation described herein.

FIG. 6 is a diagram illustrating exemplary components of SCEF 260 or NEF 360. The components of SCEF 260 or NEF 360 may be implemented, for example, via processor 420 executing instructions from memory 430. Alternatively, some or all of the components of SCEF 260 or NEF 360 may be implemented via hard-wired circuitry. As shown in FIG. 6, SCEF 260 or NEF 360 may include a gateway device interface 610, a PFD manager 620, an application server interface 630, and a connections DB 640.

Gateway device interface 610 may be configured to communicate with a gateway device, such as PGW 240 or UPF 330. For example, gateway device interface 610 may be configured to receive PFD messages from PGW 240 and/or UPF 330 and store information from the PFD messages in connections DB 640. PFD manager 620 may manage requests for PFD information associated with data traffic flows. PFD manager 620 may respond to requests from application server 170 by identifying a data traffic flow associated with a request (e.g., based on an IP address associated with UE device associated with the data traffic flow), retrieving PFD information associated the identified data traffic flow and stored in connections DB 640, and providing the retrieved PFD information to application server 170. Furthermore, PFD manager 620 may receive an instruction from application server 170 to perform an action on the data traffic flow and may forward the instruction to the gateway device associated with the data traffic flow.

Application server interface 630 may be configured to communicate with application server 170. For example, application server interface 630 may provide an API that application server 170 may use to request PFD information associated with data traffic flows, and/or to receive instructions for gateway devices to perform an action on a particular data traffic flow. Connections DB 640 may store PFD information relating to data traffic flows and received via PFD messages from gateway devices. Exemplary information that may be included in a PFD message and thus stored in connections DB 640 is described below with reference to FIG. 7.

Although FIG. 6 shows exemplary components of SCEF 260 or NEF 360, in other implementations, SCEF 260 or NEF 360 may include fewer components, different components, additional components, or differently arranged components than depicted in FIG. 6. Additionally, or alternatively, one or more components of SCEF 260 or NEF 360 may perform one or more tasks described as being performed by one or more other components of SCEF 260 or NEF 360.

Figure 7:
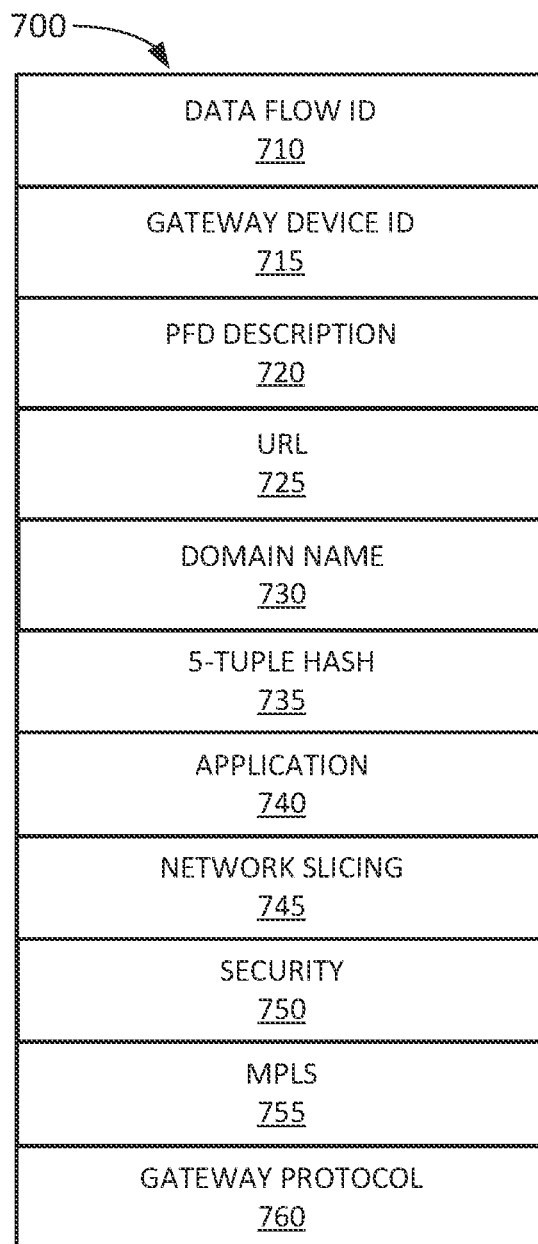
FIG. 7 illustrates exemplary components of a per flow descriptor message according to an implementation described herein.

FIG. 7 illustrates exemplary components of a PFD message 700 according to an implementation described herein. As shown in FIG. 7, PFD message 700 may include a data flow ID field 710, a gateway device ID field 715, a PFD description field 720, a uniform resource locator (URL) field 725, a domain name field 730, a 5-tuple hash field 735, an application field 740, a network slicing field 745, a security field 750, an MPLS field 755, and a gateway protocol field 760.

Data flow ID field 710 may include an ID that uniquely identifies a data traffic flow connection. Gateway device ID field 715 may include an ID for the gateway device (e.g., PGW 240, UPF 330, etc.) associated with the data traffic flow connection. PFD description field 720 may include a source IP address (e.g., an IP version 4 (IPv4) address, an IP version 6 (IPv6) address, etc.) associated with the data traffic flow connection, a destination IP address associated with the data traffic flow connection, and a protocol associated with the data traffic flow connection. The protocol may include, for example, Transmission Control Protocol (TCP), User Datagram Protocol (UDP), QUIC, General Packet Radio Service (GPRS) Tunneling Protocol (GTP), Packet Data Convergence Protocol (PDCP), Non-Access Stratum (NAS) protocol, 5G-NAS protocol, Diameter protocol, Stream Control Transmission Protocol (SCTP), Hypertext Transfer Protocol (HTTP) 2.0, Transport Layer Security (TLS) protocol, and/or another type of protocol. Additionally, or alternatively, PFD description field 720 may include a 3-tuple hash of the source IP address, the destination IP address, and the protocol. URL field 725 may include a URL associated with the data traffic flow connection. Domain name field 730 may include a domain name associated with the data traffic flow connection.

5-tuple hash field 735 may include a 5-tuple hash of the source IP address, a source IP address port, the destination IP address, a destination IP address port, and the protocol associated with the data traffic flow connection. Application field 740 may include an application ID for an application associated with the data traffic flow connection. Additionally, or alternatively, application field 740 may include an application signature for the application associated with the data traffic flow connection.

Network slicing field 745 may store one or more network slicing parameter values associated with the data traffic flow connection, such as, for example, a Network Slice Selection Assistance Information (NSSAI) value, a Slice/Service Type (SST) value, a Slice Differentiation (SD) value, and/or another type network slice identification value.

Security field 750 may store one or more security parameter values associated with the data traffic flow connection, such as, for example, a security parameter value associated with a chain of trust detection policy, a security parameter value associated with a malware detection policy, a security parameter value associated with a denial of service attack detection policy, a security parameter value associated with an encryption policy, a security parameter value associated with a policy for flagging anomalous behavior, a security parameter value associated with a policy for detecting that a particular threshold has been exceeded, and/or another type of security parameter value.

MPLS field 755 may store an MPLS label, and/or a parameter value associated with an MPLS label, associated with the data traffic flow connection. Gateway protocol field 760 may store a gateway protocol label, and/or a parameter value associated with a gateway protocol label, such as, for example, an External Border Gateway Protocol (EBGP) label, an Internal Border Gateway Protocol (IBGP) label, and/or another type of gateway protocol label.

Although FIG. 7 shows exemplary components of PFD message 700, in other implementations, PFD message 700 may include fewer components, different components, additional components, or differently arranged components than depicted in FIG. 7. For example, PFD message 700 may include additional fields, such as a gaming protocol field that includes information associated with a particular gaming protocol, a segment routing parameter value instructing the gateway device to route the data traffic flow PDUs to a particular destination (e.g., a segment routing version 6 (SRv6) parameter, etc.), a Radio Access Technology (RAT) field that stores information identifying a RAT type associated with the data traffic flow connection (e.g., a 4G LTE RAT type, a 5G NR RAT type, etc.), a Class of Service (CoS) field that includes information identifying a CoS associated with the data traffic flow connection, etc.

Figure 8:
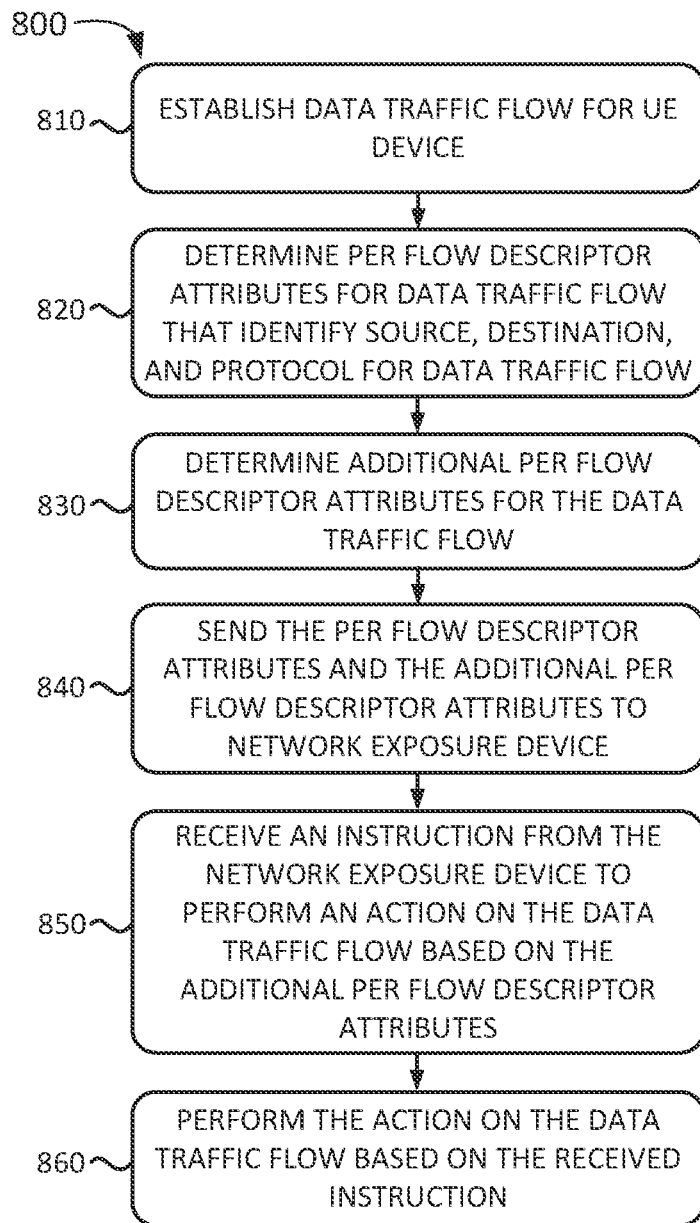
FIG. 8 illustrates a flowchart of a process for sending a per flow descriptor message according to an implementation described herein.

FIG. 8 illustrates a flowchart of a process for sending a PFD message according to an implementation described herein. In some implementations, process 800 of FIG. 8 may be performed by PGW 240 or UPF 330. In other implementations, some or all of process 800 may be performed by another device or a group of devices separate from PGW 240 or UPF 330.

As shown in FIG. 8, process 800 may include establishing a data traffic flow for a UE device (block 810). For example, UE device 110 may request to attach to core network 150 via base station 120 and base station 120 may forward the request to a mobility management device, such as MME 220 or AMF 320. If core network 150 includes a 4G core network, MME 220 may instruct SGW 230 and PGW 240 to set up a connection between UE device 110 and a network (e.g., packet data network 170, MEC network 140, etc.). If core network 150 includes a 5G core network, AMF 320 may instruct SMF 340 to set up a connection between UE device 110 and the network using UPF 330. PGW 240 or UPF 330 may allocate an IP address and/or a port to UE device 110 from an IP address pool.

PFD attributes for the data traffic flow may be determined that identify a source, destination, and protocol for the data traffic flow (block 820). For example, PFD generator 560 may determine a source IP address, a destination IP address, and protocol associated with the data traffic flow and store the determined information in connections DB 550. Moreover, PFD generator 560 may determine a URL and a domain name associated with the data traffic flow and store the determined information in connections DB 550. Furthermore, additional PFD attributes may be determined for the data traffic flow (block 830). For example, PFD generator 560 may generate a 5-tuple hash of the source IP address, the source IP address port, the destination IP address, the destination IP address port, and the protocol associated with the data traffic flow. Additionally, PFD generator 560 may determine one or more of an application ID and/or an application signature for an application associated with the data traffic flow connection, a network slicing parameter value associated with the data traffic flow, a security parameter value associated with the data traffic flow, an MPLS label associated with the data traffic flow, a gateway protocol label associated with the data traffic flow, a gaming protocol parameter value associated with the data traffic flow, a RAT type associated with the data traffic flow, a CoS associated with the data traffic flow, a segment routing parameter value associated with the data traffic flow, and/or another type of parameter value associated with the data traffic flow.

The parameter values for the PFD attributes may be determined, for example, by examining the headers of PDUs associated with the data traffic flow and/or by performing deep packet inspection (DPI) on PDUs associated with the data traffic flows. For example, PFD generator 560 may store a set of header values, IDs, and/or patterns used to identify application headers, gaming protocol headers, security protocol headers, MPLS labels, gateway protocol header, etc. PFD generator 560 may store the determined PFD information in connections DB 550. The determined PFD attributes and the additional PFD attributes may then be sent to a network exposure device (block 840). For example, in response to establishing the connection, PGW 240 or UPF 330 may send PFD message 700 to a network exposure device, such as SCEF 260 (e.g., for PGW 240), NEF 360 for (e.g., for UPF 330), or a combined SCEF/NEF device in core network 150.

An instruction may be received from the network exposure device to perform an action on the data traffic flow based on the additional PFD attributes (block 850) and the action may be performed on the data traffic flow based on the received instruction (block 860). For example, PGW 240 or UPF 330 may receive an instruction from application server 170 via SCEF 260 or NEF 360 to perform a particular action on the data traffic flow. As an example, the action may include assigning a priority value to the data traffic flow and scheduling data traffic associated with the data traffic flow based on the assigned priority value. For example, application server 170 may instruct the gateway device to assign a higher priority to a data traffic flow associated with a first PFD attribute value and assign a lower priority to data traffic flow associated with a second PFD attribute value.

As another example, the action may include filtering the data traffic flow based on a filtering criterion received from the network exposure device. For example, application server 170 may instruct the gateway device to drop PDUs associated with the data traffic flow that include a particular pattern, ID, and/or label. As yet another example, the action may include routing the data traffic flow to a destination based on a destination address received from the network exposure device. For example, the gateway device may route the data traffic flow to a data center, route the data traffic flow to a MEC network, route the data traffic flow to a destination via a Layer 2 connection, perform a local breakout (LBO) on the data traffic flow, and/or route the data traffic flow to a different type of destination.

Figure 9:
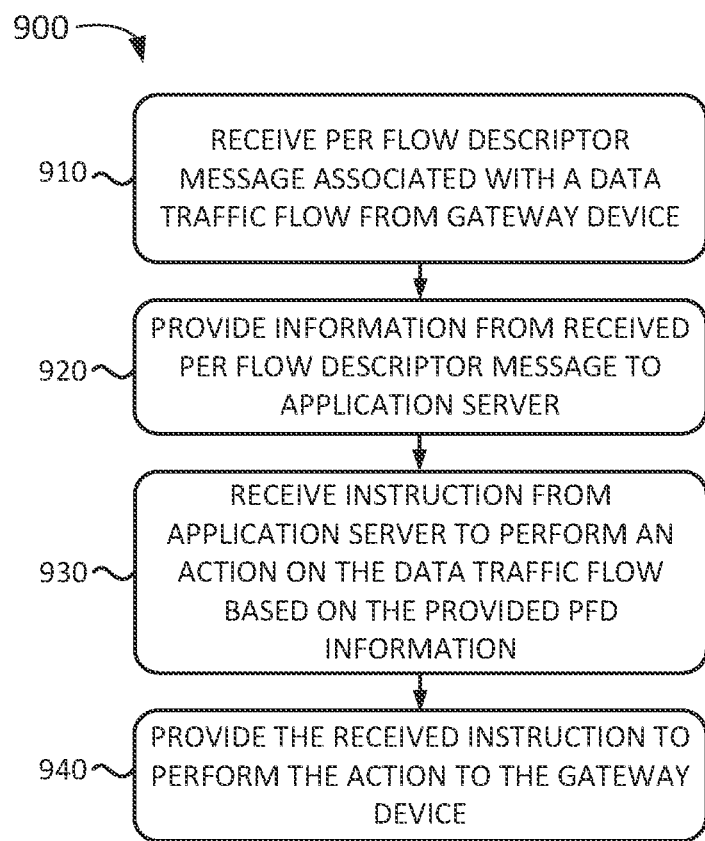
FIG. 9 illustrates a flowchart of a process for processing a per flow descriptor message according to an implementation described herein.

FIG. 9 illustrates a flowchart of a process for processing a PFD message according to an implementation described herein. In some implementations, process 900 of FIG. 9 may be performed by SCEF 260, NEF 360, or a device combined to function as both SCEF 260 and NEF 360. In other implementations, some or all of process 900 may be performed by another device or a group of devices separate from SCEF 260, NEF 360, or the device combined to function as both SCEF 260 and NEF 360.

As shown in FIG. 9, process 900 may include receiving a PFD message from a gateway device that established a connection to a UE device via a RAN (block 910) and providing information from the received PFD message to an application server (block 920). For example, SCEF 260 or NEF 360 may receive PFD message 700 and store information included in PFD message 700 in connections DB 640. A request may be received from application server 170 via an API for PFD information relating to a data traffic flow. SCEF 260 or NEF 360 may identify the data traffic flow based on, for example, an IP address associated with the data traffic flow and included in the request from application server 170. SCEF 260 or NEF 360 may retrieve PFD information associated with the data traffic flow from connections DB 640 and provide the retrieved PFD information to application server 170.

An instruction may be received from the application server to perform an action on the data traffic flow based on the provided PFD information (block 930) and the received instruction to perform the action may be provided to the gateway device (block 940). For example, application server 170 may send an instruction to SCEF 260 or NEF 360 via an API to perform an action on the data traffic flow and SCEF 260 or NEF 360 may forward the received instruction to the gateway device (e.g., PGW 240 or UPF 330).

Figure 10:
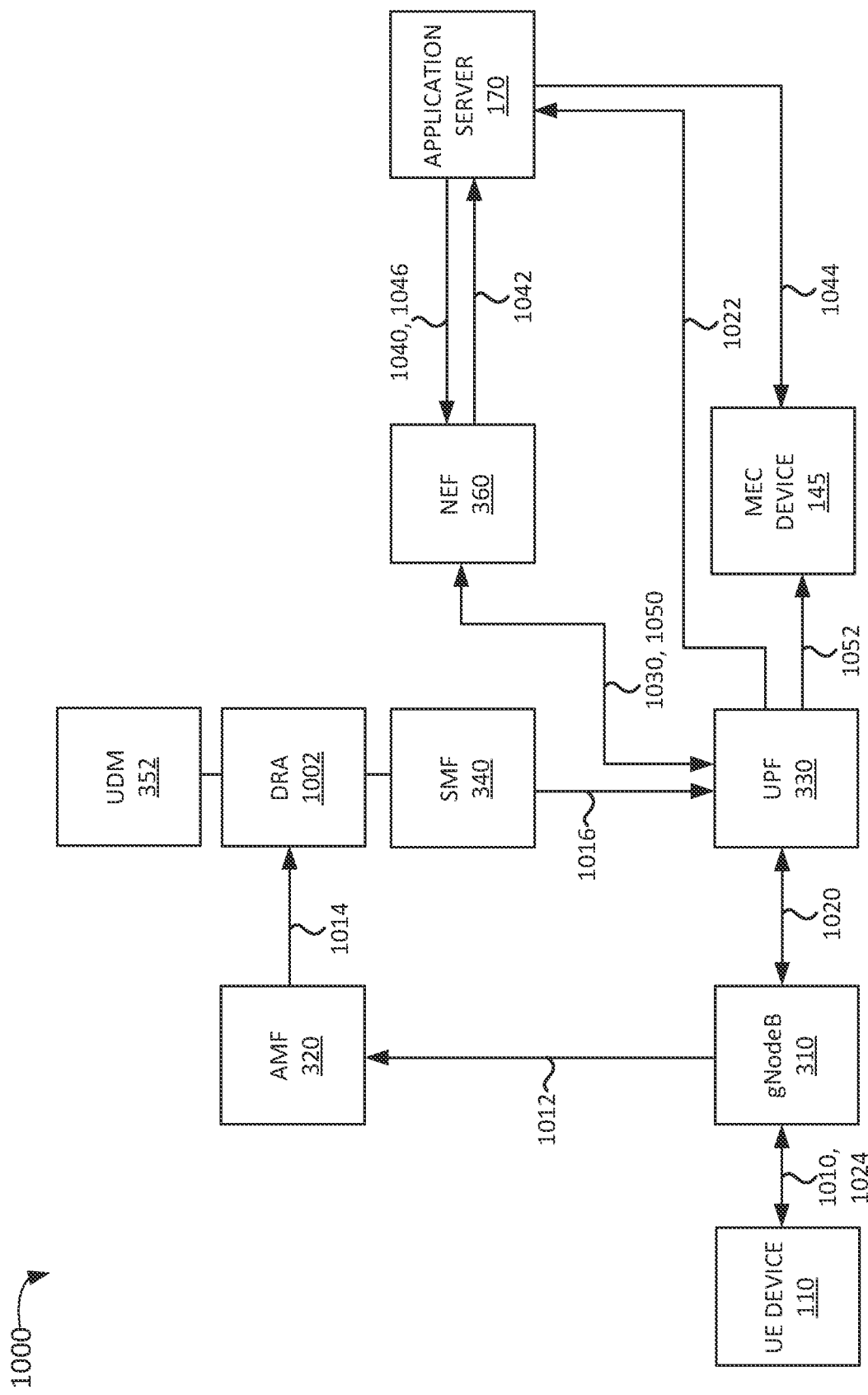
FIG. 10 illustrates an exemplary signal flow diagram according to an implementation described herein.

FIG. 10 illustrates an exemplary signal flow 1000 according to an implementation described herein. As shown in FIG. 10, signal flow 1000 may include UE device 110 requesting to attach to core network 150 and connect to application server 170 via gNodeB 310 (signal 1010) and gNodeB 310 forwarding the request to AMF 320 (signal 1012). AMF 320 may instruct SMF 340 to set up a connection to application server 170 via Diameter Routing Agent (DRA) 1002 (signal 1014). DRA 1002 may function as a routing device in core network 150. SMF 340 may instruct UPF 330 to set up a PDU connection between UE device 110 and application server 170 (signals 1020, 1022, and 1024).

In response to establishing the connection, UPF 330 may send PFD message 700 to NEF 360 (signal 1030). When application server 170 detect the data flow connection from UE device 110 (signal 1022), application server 170 may determine the IP address associated with UE device 110 and may request PFD information associated with the determined IP address from NEF 360 (signal 1040). NEF 360 may identify UE device 110 associated with the IP address based on information stored in connections DB 640 and respond by providing any identified PFD information to application server 170 (signal 1042).

Application server 170 may select, based on the PFD information, to route the data traffic flow to a local instance of the application service running on MEC device 145. For example, application server 170 may communicate with the local instance running on MEC device 145 to instruct MEC device 145 to provide content to UE device 110 via the data traffic flow in order to improve latency (signal 1044). Thus, application server 170 may send an instruction to NEF 360 to route the data traffic flow associated with UE device 110 to MEC device 145 (signal 1046) and NEF 360 may forward the instruction to UPF 330 (signal 1050). In response, UPF 330 may route the data traffic flow to MEC device 145 instead of application server 170 (signal 1052).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8 and 9, and a series of signals have been described with respect to FIG. 10, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a device, per flow descriptor attributes associated with a data traffic flow for a user equipment (UE) device, wherein the per flow descriptor attributes identify a source, a destination, a protocol associated with the data traffic flow, and at least one additional attribute for the data traffic flow, wherein the at least one additional attribute includes a 5-tuple hash of a source Internet Protocol (IP) address, a source IP address port, a destination IP address, a destination IP address port, and a protocol associated with the data flow;
    sending, by the device, the per flow descriptor attributes to a network exposure device of a core network; and
    receiving, by the device and from the network exposure device, an instruction to perform an action on the data traffic flow based on the at least one additional attribute, wherein the action includes at least one of assigning a priority value to the data traffic flow or filtering the data traffic flow.

2. The method of claim 1, further comprising:
    performing the action on the data traffic flow.

3. The method of claim 1, wherein the at least one additional attribute further includes an application signature for an application associated with the data traffic flow, a gaming protocol identifier, a security parameter value, a multicast parameter value, a multiprotocol label switching (MPLS) parameter value, a gateway protocol parameter value, or a segment routing parameter value.

4. The method of claim 1, wherein the action further includes:
    routing the data traffic flow to a destination based on a destination address received from the network exposure device.

5. The method of claim 4, wherein the routing the data traffic flow to the destination based on the destination address received from the network exposure device includes:
    routing the data traffic flow to a data center.

6. The method of claim 4, wherein the routing the data traffic flow to the destination based on the destination address received from the network exposure device includes:
    routing the data traffic flow to a multi-access edge computing (MEC) network.

7. The method of claim 4, wherein the routing the data traffic flow to the destination based on the destination address received from the network exposure device includes:
    routing the data traffic flow to a destination via a Layer 2 connection.

8. The method of claim 4, wherein the routing the data traffic flow to the destination based on the destination address received from the network exposure device includes:
    performing a local breakout (LBO) on the data traffic flow.

9. A device comprising:
    a processor configured to:
        determine per flow descriptor attributes associated with a data traffic flow for a user equipment (UE) device, wherein the per flow descriptor attributes identify a source, a destination, a protocol associated with the data traffic flow, and at least one additional attribute for the data traffic flow, wherein the at least one additional attribute includes a 5-tuple hash of a source Internet Protocol (IP) address, a source IP address port, a destination IP address, a destination IP address port, and a protocol associated with the data flow;
        send the per flow descriptor attributes to a network exposure device of a core network; and
        receive, from the network exposure device, an instruction to perform an action on the data traffic flow based on the at least one additional attribute, wherein the action includes at least one of assigning a priority value to the data traffic flow or filtering the data traffic flow.

10. The device of claim 9, wherein the at least one additional attribute further includes an application signature for an application associated with the data traffic flow, a gaming protocol identifier, a security parameter value, a multicast parameter value, a multiprotocol label switching (MPLS) parameter value, a gateway protocol parameter value, or a segment routing parameter value.

11. The device of claim 9, wherein the processor is further configured to:
    perform the action on the data traffic flow.

12. The device of claim 11, wherein, when performing the action, the processor is further is configured to:
    route the data traffic flow to a destination based on a destination address received from the network exposure device.

13. The device of claim 12, wherein, when routing the data traffic flow to a destination based on a destination address received from the network exposure device, the processor is further configured to:
    route the data traffic flow to a multi-access edge computing (MEC) network.

14. The device of claim 12, wherein, when routing the data traffic flow to a destination based on a destination address received from the network exposure device, the processor is further configured to:
    route the data traffic flow to a destination via a Layer 2 connection.

15. The device of claim 12, wherein, when routing the data traffic flow to a destination based on a destination address received from the network exposure device, the processor is further configured to:
    perform a local breakout (LBO) on the data traffic flow.

16. A system comprising:
    a first device configured to:
        expose services or capabilities of a core network to computing devices outside the core network; and
    a second device configured to:
        determine per flow descriptor attributes associated with a data traffic flow for a user equipment (UE) device, wherein the per flow descriptor attributes identify a source, a destination, a protocol associated with the data traffic flow, and at least one additional attribute for the data traffic flow, wherein the at least one additional attribute includes a 5-tuple hash of a source Internet Protocol (IP) address, a source IP address port, a destination IP address, a destination IP address port, and a protocol associated with the data flow;
        send the per flow descriptor attributes to the first device of a core network;
        receive, from the first device, an instruction to perform an action on the data traffic flow based on the at least one additional attribute; and
        perform the action on the data traffic flow, wherein the action includes at least one of assigning a priority value to the data traffic flow or filtering the data traffic flow.

17. The system of claim 16, wherein the at least one additional attribute further includes an application signature for an application associated with the data traffic flow, a gaming protocol identifier, a security parameter value, a multicast parameter value, a multiprotocol label switching (MPLS) parameter value, a gateway protocol parameter value, or a segment routing parameter value.

18. The system of claim 16, wherein, when performing the action, the second device is further is configured to at least one of:
    route the data traffic flow to a data center;
    route the data traffic flow to a multi-access edge computing (MEC) network;
    route the data traffic flow to a destination via a Layer 2 connection; or
    perform a local breakout (LBO) on the data traffic flow.

19. The system of claim 16, wherein the action includes assigning the priority value to the data traffic flow.

20. The system of claim 16, wherein the action includes filtering the data traffic flow.

* * * * *